United States Patent [19]
Warn

[11] Patent Number: 5,270,943
[45] Date of Patent: Dec. 14, 1993

[54] FUEL PUMP CONTROL CARD
[75] Inventor: Walter E. Warn, Knighdale, N.C.
[73] Assignee: Progressive International Electronics, Raleigh, N.C.
[21] Appl. No.: 816,653
[22] Filed: Jan. 3, 1992
[51] Int. Cl.$^5$ .................. G06F 15/20; G05B 15/00
[52] U.S. Cl. .................................. 364/479; 364/131
[58] Field of Search ............... 364/131, 132, 465, 479; 222/25, 28, 51; 137/624.11

[56] References Cited
U.S. PATENT DOCUMENTS

| | | | |
|---|---|---|---|
| 4,107,777 | 8/1978 | Pearson et al. | 364/465 |
| 4,216,529 | 8/1980 | Krystek et al. | 364/510 |
| 4,247,899 | 1/1981 | Schiller et al. | 364/465 |
| 4,550,859 | 11/1985 | Dow, Jr. et al. | 222/26 |
| 5,208,742 | 5/1993 | Warn | 364/131 |

Primary Examiner—Jerry Smith
Assistant Examiner—Paul Gordon
Attorney, Agent, or Firm—Fred K. Carr

[57] ABSTRACT

The present invention relates to a fuel pump control system for controlling fuel dispensers through a PC-based POS terminal. The system includes a printed circuit board which can be inserted in an expansion slot in the PC for controlling the fuel dispensers. The system uses a microprocessor with read-only-memory and read-and-write-memory. A series of commands are stored in the ROM for controlling the dispensers during the fueling process. A configuration circuit translates and configures the communication protocol of the pump control system and the communication protocol of the dispensers allowing them to interact. Response data from the dispenser during the fueling process is stored in the RAM. The pump control system is interfaced to the POS application software in the POS. In a preferred embodiment, the flow of data between the microprocessor in the pump controller and the microprocessor in the PC-based POS is controlled by a terminate-stay-resident driver. The system allows the POS application software program to integrate pump control with other features as cash register, card authorization, inventory control, and related. The present invention is particularly well suited for use in open-platform PC-based POS systems, can accommodate customized POS application programs.

6 Claims, 5 Drawing Sheets

FUEL PUMP CONTROL CARD

FIELD OF THE INVENTION

The present invention relates to a device and method for controlling fuel dispensers, and more particularly, to a fuel pump control system which includes a circuit board insertable in the mother board of a PC-based point-of-sales register system for controlling the fuel dispensers.

BACKGROUND OF THE INVENTION

The price of petroleum based fuel has greatly increased during years. As a result, it is now common practice for the vehicle operator to pump his fuel at so-called self service fueling sites, which usually offer lower prices. Since the customer pumps the fuel, these sites often have specialized fuel dispensing systems where the dispensers are controlled by a remote dispenser controller. These systems allow an attendant in the store to control the dispensers from inside.

In general, a fuel dispenser includes a pump, a fuel supply nozzle, a flow meter, a flow quantity signal generator, and a flow indicator. The pump has a one end a pipe connection to a fuel supply tank, and at the other end a hose connection to a fuel supply nozzle. The flow meter measures the quantity of fuel being pumped, and the flow quantity generator generates a flow quantity signal from the flowmeter. The indicator indicates the quantity of fuel being dispensed according to the flow quantity signal.

The dispenser controller is most often located in a building where other items are available for sale. The controller has electrical connections to the dispensers for transferring data signals for monitoring and controlling the dispensing operation. In general, the dispenser controller is a microprocessor with read-only-memory (ROM), read-and-write memory (RAM), and input/output ports for reading and storing information. The controller sends data signals to the dispensers, and the dispensers send data signals to the controller. Data signals sent to the dispenser from the controller include price per gallon to be charged at corresponding pumps, preset limits of fuel to be pumped at corresponding pumps, and pump authorization. Data signals sent from the pumps to the controller include pump identity (pump number), pump status, and dispensed fuel volume and value.

Two types of dispenser controllers are presently used. The first type is a control console which is a separate device from the cash register. The console has a number of push buttons for controlling the dispensers, and a visual display for indicating the volume or dollar value of the fuel pumped during a transaction. This type system requires that the attendant transfer transaction information, taken from the console display, and key it into the cash register for recording. This is a disadvantage of the system in that it allows for error, or possibly intentional false entries, by the attendant on the amount of fuel dispensed.

The other, more recently developed, type system is a logic module which interfaces the dispensers to a point-of-sales (POS) device such that the pumps are controlled through the POS. The dispensers are controlled from keys on the POS transaction board, and information on each transaction is passed directly into the POS. These devices are generally referred to as pump access modules, or interfaces, in the industry.

There are several commercial brands of dispensers used in the industry, and most offer one or both types of remote controller for controlling their pump brand. Each pump brand has its own unique communication protocol for communication between the dispenser and controller. Certain dispensers use current loop communication, others use voltage level communication. Several dispenser manufacturers have developed a pump access interface for interfacing their pumps to POS systems. Other manufacturers, including the assignee of this application, manufacturer a pump access interface which interfaces different pump brand to a POS system. This is achieved by including a communication translator in the interface.

Years ago petroleum fuels were sold primarily at service stations which limited their products to fuel and auto accessories. For that type retail operation, a simple cash register was all that was needed to record sales. Today, however, many petroleum retailers have expanded their product lines to include grocery items, household goods, novelty items, prepared foods, etc. These operations are usually referred to as convenience stores. These larger retail operations need a more sophisticated cash register, or POS system, to record sales, control inventory, process credit cards, provide bar code scanning, and related.

PC-based POS systems provided a solution for larger retail operations, and are used in the industry for this purpose. PC-based POS systems, through its POS application software, can integrate features as pump control, cash register function, card authorization, inventory control, and site management reports. This is done by interfacing auxiliary software programs to the POS application software. With regard to pump control, this is presently achieved by using a pump access interface, previously discussed. The pump access interface is connected to the PC through an input/output port, for example a RS-232 port. A disadvantage of this approach is that pump access interface is a separate device from the POS, therefore it requires its own power supply, housing, and related.

The present invention provides a new approach for controlling fuel dispensers in PC-based POS systems. The present invention relates to a pump control system comprising a circuit board which can be connected to the mother board of the PC through an expansion slot. Depending upon programming, the pump control board can control electronic and electro-mechanical gasoline, diesel, LP gas, and natural gas dispensers. The board can control up to 32 fueling positions with as many as nine hoses at each dispenser.

The pump control board provides several advantages over the pump access interface presently used. It can be inserted in an expansion slot in the PC forming an integral part of the POS system rather than being a separate device. The pump control card can be used in a stand-alone POS system, or it can be used in a networked system having two or more terminals in a master/slave relationship. The pump control card provides faster communication between the controller and dispensers, yet it cost less to manufacturer since it uses the same power supply as the PC, and does not require a separate housing. With the pump control board, only nine commands are necessary to control all fuel dispensing functions.

SUMMARY OF THE INVENTION

In summary, the present invention relates to a fuel pump control system for controlling fuel dispensers through a PC-based POS terminal. The system includes a printed circuit board which can be inserted in an expansion slot in the PC. The system uses a microprocessor with read-only-memory and read-and-write-memory. A series of commands are stored in the ROM for controlling the dispensers during the fueling process. A configuration circuit allows the communication protocol of the pump control system and the communication protocol of the dispensers to interact. Response data from the dispenser during the fueling process is stored in the RAM. The flow of data between the microprocessor in the pump controller and the microprocessor in the PC-based POS is controlled by a terminate-stay-resident driver. The system allows the POS application software program to integrate pump control with other features as cash register, card authorization, inventory control, and related.

The present invention is particularly well suited for use in open-platform PC-based POS systems. These systems can accommodate customized POS application programs. By using the pump control board, pump control can be easily incorporated into the application software which most often includes other features, or modules, as credit card authorization, inventory control, and management reports. The pump control board can be inserted in an expansion slot in the PC.

Accordingly, the primary object of this invention is to provide a fuel pump control system for controlling fuel dispensers through a PC-based POS system.

A further object of this invention is to provide a fuel pump control system which includes a circuit board which can be inserted in an expansion slot of the PC in a PC-based POS system.

A further object of the present invention is to provide a fuel pump control system which can be used in a stand alone PC-based POS terminal or in a networked POS system with several terminals.

A further object of the present invention is to provide a fuel pump control system which can control pumps and dispensers of different manufacturers.

BRIEF DESCRIPTION OF THE DRAWINGS

Other objects of this invention will appear in the following specification and claims, reference being made to the accompanying drawings which form a part thereof.

DETAILED DESCRIPTION OF THE INVENTION

Figure 1:
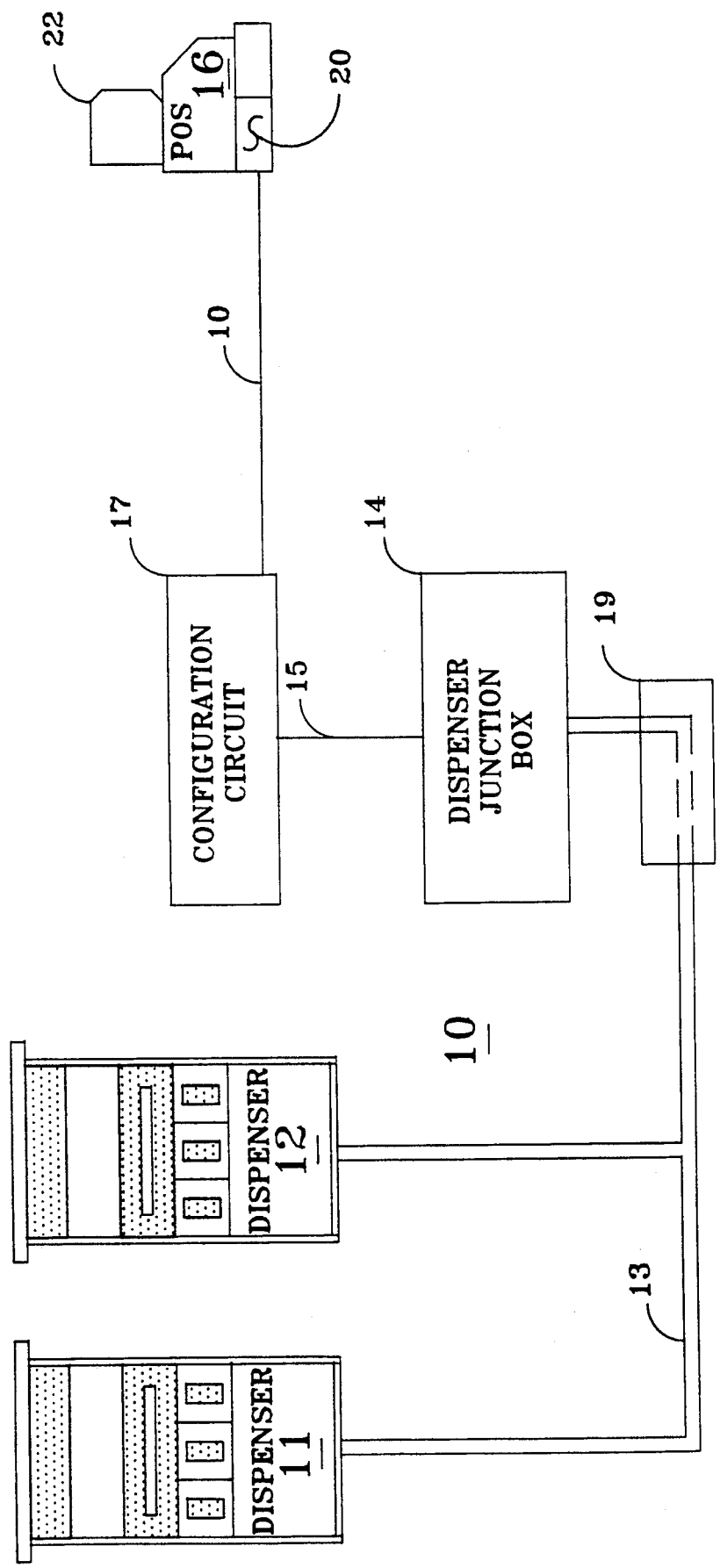
FIG. 1 is a schematic diagram of a fuel dispensing facility having dispensers electrically connected to a POS terminal.

Referring now to the drawings, and first to FIG. 1, there is shown a schematic overview of a fuel dispensing system, generally designated (10). There is shown two dispensers (11,12) electrically connected to a POS terminal (16) by data wire (13) which, in the illustration, forms a loop. The POS (16) controls the dispensing process at the dispensers (11,12) by transferring data signals to and from the dispensers through data wire (13). For this discussion, an example of two dispensers is used. In the industry, however, it is common for a facility to have several dispensers positioned such that there is room for vehicles to park on each side for fueling. It is understood that two dispensers are used only for illustration, and further that the dispensers may be single product, dual product, or multi-product dispensers.

In the illustration, a data wire (13) runs from the pump junction box (14) to each dispenser (11,12) and back to the junction box (14) forming a loop. (This illustration shows a wiring example where the dispensers-controller are communicating by current loop communication.) There is a wiring trough (19) through which the data wire (13) passes for providing protection to underground wire. Configuration cable (15) electrically connects the configuration circuit board (17) to the data wire (13) in the pump junction box (14). The pump control board, generally designated (20), is located in the POS (16), and is electrically connected to the configuration board (17) by the POS cable (18).

The pump control board (20) sends data signals (commands) to the dispensers (11,12), and the dispensers send data signals (responses) to the control board. Signals from the control board (20) to the dispensers (11,12) include price per gallon to be charged at corresponding pumps, preset limits for fuel to be dispensed, and pump authorization (i.e., an activated mode whereby the pump will dispense fuel when the customer opens a valve in the nozzle.) Simultaneously, signals are being generated at the dispensers (11,12) for presentation to the control board (20). These include pump number, pump status, and dispensed fuel volume and value for the pump. As later discussed, the pump control board uses a series of nine communication commands to control the dispensers, where a command is initiated through a key on the POS transaction board.

Dispenser manufacturers use different wiring arrangements and a unique communication protocol for communication between their dispensers and controller. A wiring example for current loop communication is shown in FIG. 1. Another type communication used in the industry is voltage level. As later discussed, the present invention can control various dispenser brands by using a configuration circuit (17) to translate command and response signals between the dispensers (11,12) and the pump control board (20).

During a fueling transaction, a customer pulls his vehicle along side one of the dispensers: for example dispenser (11). The customer removes the nozzle, not shown, and inserts it in his fuel tank. When the nozzle is removed from the dispenser, the attendant in the store receives a signal that a customer wants service. The attendant authorizes the pump by pushing a key on the POS terminal (16). As the fuel is dispensed, response data fields are generated and sent to the control board (20). When the customer is finished and places the nozzle back on the dispenser, the volume or value of the fuel dispensed is displayed on the POS screen (22).

PC-based POS systems are now being more widely used in the industry since this type system allows integration of features as pump control, cash register function, credit card authorization, inventory control, and management reports in the same system. Generally, these task are performed by auxiliary software application programs which are interfaced to the main POS application software program. The present invention allows one to control the fuel dispensers through the POS application software program where the pump control function is on a daughter board which is plugged into the main (mother) PC board. In this specification, PC is generally defined as a self-contained computing unit which may be used in a stand alone mode or in a network of computing units.

Figure 2:
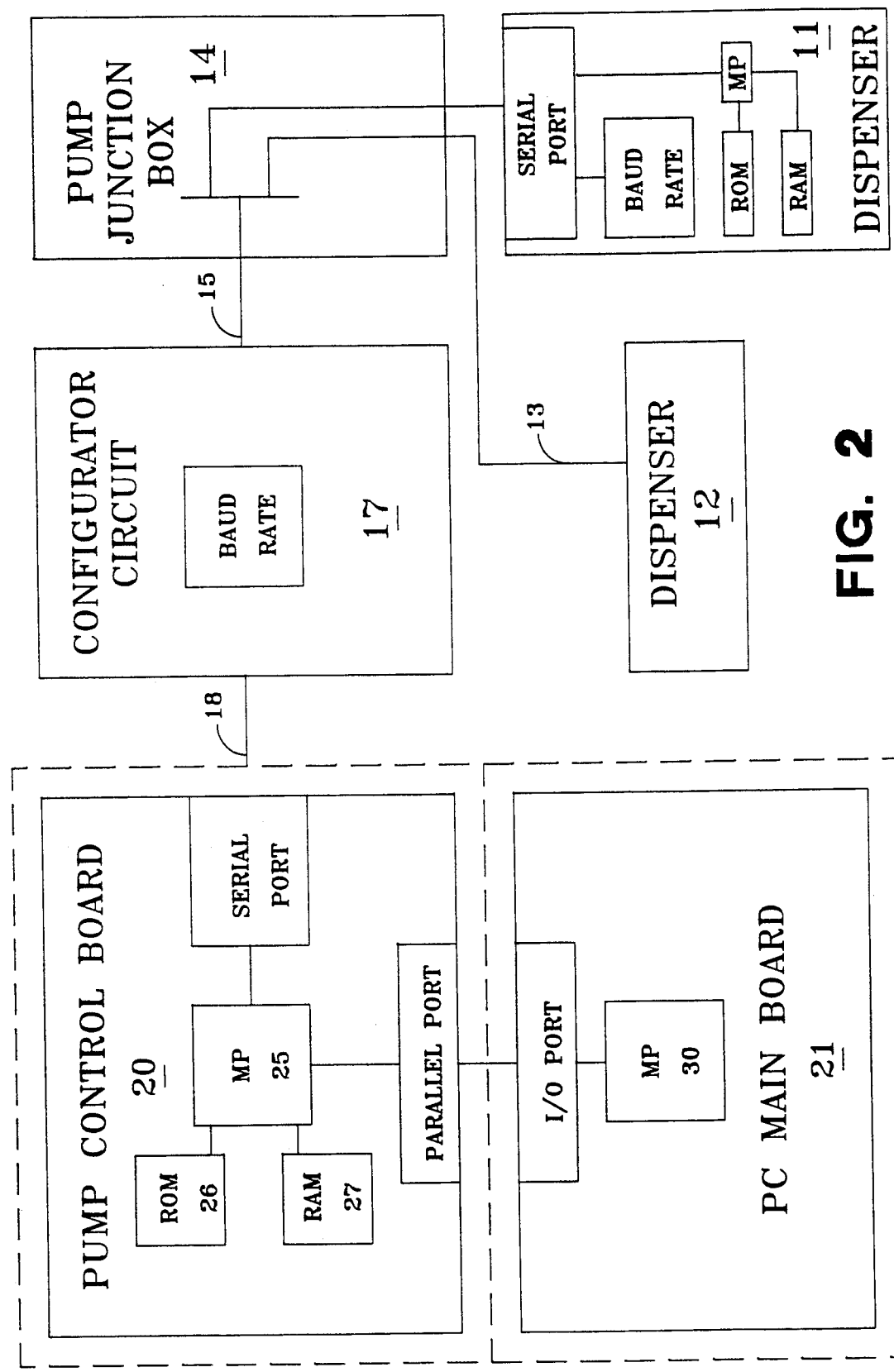
FIG. 2 is a block diagram of the functional components of the invention with connections to the dispensers and PC.

Referring now to FIG. 2, there is shown a schematic block diagram of the pump control system including the pump control board (20). In a preferred embodiment, the pump control system (20) includes a printed circuit board which is plugged into an expansion slot on the main PC board by pin connectors (not shown). The pump control board (20) includes a microprocessor (25), Zylog Z841 being an example, with associated software programs for processing the pump control commands, receiving and storing the data responses. The system includes a read-only memory chip, ROM (26), for storing the pump control commands, and a read-and-write memory chip, RAM (27) for storing variables as prices to be charged at the dispensers, totals dispensed by the dispensers, and responses data from the dispensers during the dispensing process. These chips have conventional bus connections with the microprocessor (25).

A feature of the pump control system (20) is that it has the ability to control several dispenser brands, each of which have their own unique communication protocol. This is accomplished by a configuration circuit (17). Electronic dispensers have within electronic computers with memory devices for controlling the dispensing process and communicating with the dispenser controller. As previously stated, certain dispenser brands use current loop communication, others use voltage level communication, still others use a mixture thereof. The configuration circuit (17) is, in effect, a circuit for translating communication protocols, thereby providing a method for controlling the pumps in accordance with dispenser protocol. For example, with dispensers using current level communication, it is a current translator; with dispensers using voltage level communication, it is a voltage translator. Configuration board (17) is connected to the pump control system (20) through POS cable (18), and has a baud rate chip for synchronizing input/output to the microprocessor (25). In the illustration, configuration circuit (17) is shown as a separate device, however, it is understood that the configuration circuit could be included as an integral part of the pump control board.

The configuration circuit (17) is connected to the pump data wire (13) in the junction box (14) through data cable (15). The pump junction box is generally a common box in which all wiring to and from the pumps have a common connection. With certain dispenser brands, the junction box is called a distribution box; with other dispenser brands, it is called a site controller. Generally, electronic fuel dispensers have there own microprocessor with ROM and RAM for controlling the pumps, valves, flow quantity generators, and related, used during the pumping operation. There is a serial connection between the wiring from the junction box to the microprocessor in the dispensers. As stated, all dispensers in the communication circuit have a common connection in the junction box where the configuration cable (15) is connected. By this arrangement, all dispensers are electrically connected to the pump control board.

Fuel Pump Control Protocol

Following is an illustrative example of the communication protocol used in a preferred embodiment of the fuel pump control board. Nine commands are used to control the dispensers during the fueling process. The commands are stored in the ROM (26), and include: pump authorization, sale information, pump stop, pump resume, error, status request, reset, pump totals, and price per unit. The protocol can be used to control up to 99 fueling positions and 9 grades on each position. Commands are initiated through keys on the transaction board on the POS.

The protocol uses a "2's" compliment check byte. Each command and response data is transferred in a formatted frame starting with a "start of text" (ASCII STX [02]), followed by the command and data or response, followed by the "end of text" (ASCII ETX [03]) and the check byte. All data (except the check byte) are ASCII characters. All commands are one character. The pump number is two characters, the hose number is one character. All commands are "ACKed" (ASCII 06) or "NAKed" (ASCII 15/16), but the responses are not.

Command format:
    STX CMD [Pump] [Hose] [... Data ... ] ETX CD
        STX =           ASCII 02/16
        CMD =           command code (one character)
        Pump =          fueling positions (two characters)
        Hose =          grade number (one Character)
        Data =          programming data or action
        ETX =           ASCII 03/16
        CD =            check digit The AUTHORIZATION COMMAND is used to start a fueling operation. A preset limit of fuel to be dispensed can be set to a dollar or volume amount, or no limit, i.e. fill-up. If a fill up operation is requested, the dollar and volume fields are ignored. All decimal points are implied but not sent. A hose number of zero allows any hose to be authorized.

Command Character: A
Command Format:
STX A Pump# Hose# Flag $$$$.$$ VVV.VVV ETX CD
    A =             command code
    Pump# =         fueling position (2 characters)
    Hose# =         Hose number (1 character)
    $$$$.$$ =       dollar limit amount
    VVV.VVV =       volume limit amount
Flag options:
    '0' =           Dollar limit (credit price)
    '1' =           Dollar limit (cash price)
    '2' =           volume limit (credit price)
    '3' =           volume limit (cash price)
    '4' =           fill up (no limit)
Response:
    ACK / NAK only The SALE INFORMATION COMMAND is used to read the sale information of clear the sale flag. This command can be used at any time during a sale in progress, all fields known will be filled in. The information in this response (once the sale is complete) is what actually took place at the fueling position. It may not always be what was authorized by the authorization command due to some brands of pumps capabilities. The 'R' flag indicates a "read sale" operation and the 'C' flag indicates a "clear sale" ready operation.

```
Command: B
Command format:
STX B Pump# Flag ETX CD
      B =              command code
      Pump# =          fueling position (2 characters)
      Flag =           type of operation (1 Character)
Flag operation:
      R =              read sale information
      C =              clear sale ready status
Response:
      Clear operation: ACK / NAK only
Read operation:
STX Pump# Hose# Flag $$$$.$$ VVV.VVV ETX CD
      Pump# =          fueling position (2 characters)
      Hose# =          hose number (1 character)
      Flag =           type of sale (1 character)
      $$$$.$$ =        dollar amount (2 decimal places)
      VVV.VVV =        volume amount (3 decimal places)
Flag indicator:
      '0' =            credit sale
      '1' =            cash sale
```

The STOP COMMAND is used to stop one or all fueling positions. The fueling position may or may not go to an end of sale status depending on the pump brand and type of pump. Once this command is issued, a resume command must be issued to clear the stopped status. A fueling position of '00' indicates an all stop operation.

```
Command character: C
Command format:
STX C Pump# ETX
      C =              command code
      Pump# =          fueling position (2 characters)
Response:
ACK / NAK only
```

The RESUME COMMAND is sued to resume one or all fueling positions. A fueling position of '00' indicates an all resume operation. This command is used in response to a Stop Command.

```
Command character: D
Command format:
STX D Pump# ETX
      D =              command code
      Pump# =          fueling position (2 characters)
Response:
ACK / NAK only
```

The ERROR COMMAND is used to read the error queued. These errors may be related to the pumps or to the system. Each error includes the pump number (00=system error) and an error code. The procedure is to read the error and then clear it. If the "Error Queued" status bit is still set, another error is queued.

```
Command character: E
Command format:
STX E Flag ETX CD
      E =              command code
      Flag =           operation type
Flag operation:
      R =              read the error
      W =              clear the top error
      C =              flush the error queue
Response:
```

-continued
```
Clear / flush operation: ACK / NAK only
Read operation:
STX Pump# EC ETX CD
      pump # =         fueling position (00 = system)
      EC =             error type (two characters)
Error codes:
System codes:
      01 =             check sum of PROM failed
      02 =             byte test of RAM failed
      03 =             reserved
      04 =             all pump communication down
      05 =             invalid command received
      06 =             authorization failed
      07 =             reserved
Pump codes:
      01 =             unit price on pump incorrect
      02 =             pump did not stop at preset amount
      03 =             invalid data from pump
      04 =             communication down for pump
      05 =             invalid pump status
      06 =             reserved
      07 =             pump authorized by itself
```

The STATUS REQUEST COMMAND is used to read the status of each pump. The status indications are "bit" oriented. The first status in the response is the systems status, the remainder of the statuses are for the fueling positions. Each status consists of two ASCII characters. The lower nibble (4 bits) of the character are the status bits. The upper nibble is always a '3' (0011 binary). There are two types of status requests. The first status request is without the option 'E' flag. This status maintains downward compatibility and returns the status for the first 16 fueling positions. The 'E' option returns a status for each pump (32 fueling positions). The 'E'xtended status if the preferred command and returns additional information.

```
Command character: F
Command format:
STX F [E] ETX CD
Response:
STX Ss Pp Pp ... Pp ETX CD
System status:
      S =              Bit 3 = reserved
                       Bit 2 = reserved
                       Bit 1 = reserved
                       Bit 0 = communication down for all pumps
      s =              Bit 3 = error in error queue
                       Bit 2 = controller has completed reset
                       Bit 1 = controller running on battery
                       Bit 0 = emergency stop sent to pumps
Pump status
      P =              Bit 3 = pump has been sent stop
                       Bit 2 = drive away; amount has not increased
                                in 7 seconds
                       Bit 1 = pump is dispensing fuel
                       Bit 0 = sale is complete
      p =              Bit 3 = controller allowed to authorize
                       Bit 2 = authorization sent to pump
                       Bit 1 = pump communication established
                       Bit 0 = pump handle is lifted, request
                                service
```

The RESET COMMAND is used to reset the controller. The result of this command is all data and configuration is reset and the 'Controller Reset' status bit (bit 2 of system status two) is set. The controlling program must configure the controller before any operations can be performed.

```
Command: G
Command format:
```

```
                STX G ETX CD
            Response:
                ACK / NAK only
```

The PUMP TOTALS COMMAND is used to read the totals from the requested fueling position and hose number. It is noted that some dispensers can return volume, cash and credit totals and others can return only volume and money totals.

```
Command character: I
Command format:
STX I Pump# Hose# ETX CD
    Pump#  =           fueling position (2 characters)
    Hose#  =           hose number (1 character)
Response:
STX Pump# Hose#
VVVVVVV.VV XXXXXXX.XX YYYYYYY.YY ETX CD
    Pump#      =       fueling position (2 characters)
    Hose#      =       hose number (1 character)
    Flag       =       totals type
    VVVVVVV.VV =       volume totals
    XXXXXXX.XX =       credit totals
    YYYYYYY.YY =       cash totals
Totals type flag:
    '0' =.             totals not available for pump
    '1' =              pump busy try later
    '2' =              money totals only
    '3' =              cash & credit totals
```

The PRICE PER UNIT COMMAND is used to read or set the price per unit on the fueling position. With this command, the controller can be configured. A price must be sent to hose number one of the fueling position exists. If multiple hoses are sent prices, the fueling position is considered to be an multi-product dispenser.

```
Command character: J
Command format:
STX J Pump# Hose# Flag XXX.XX YYY.YY ETX CD
    Pump#  =           fueling position (2 characters)
    Hose#  =           hose number (1 character)
    Flag   =           operation type
    XXX.XX =           credit price
    YYY.YY =           cash price
Operation flag:
    R =                read operation
    W =                write operation
Response:
Write operation:
ACK / NAK only
Read operation:
STX pump# Hose# XXX.XX YYY.YY ETX CD
    Pump#  =           Fueling position
    Hose#  =           hose number
    XXX.XX =           credit price
    YYY.YY =           cash price
```

Figure 4:
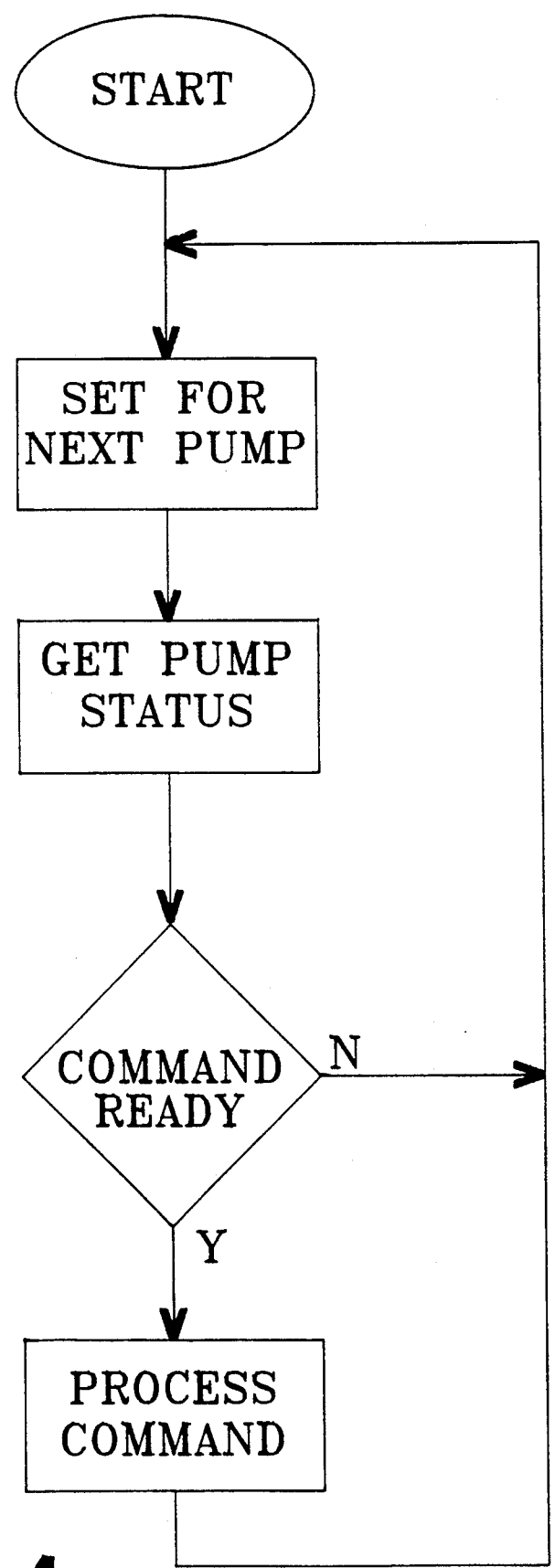
FIG. 4 is a flow chart of the operation of the read-only-memory device of the invention.

Referring now to FIG. 4, there is shown a flow chart for command processing by the ROM (26). The dispensers are constantly polled by the microprocessor (25) to determine pump status. For example, there is a request for service at a dispenser; a customer lifted the nozzle and the pump needs to be authorized. The authorization command, previously discussed, is readied and the command processed. When the transaction is complete, the nozzle is replaced and this is detected by polling. The system goes into a collect mode. The sale information command is readied and a "read sale" operation is processed, followed by a "clear sale" operation.

Pump Control System Driver

Figure 3:
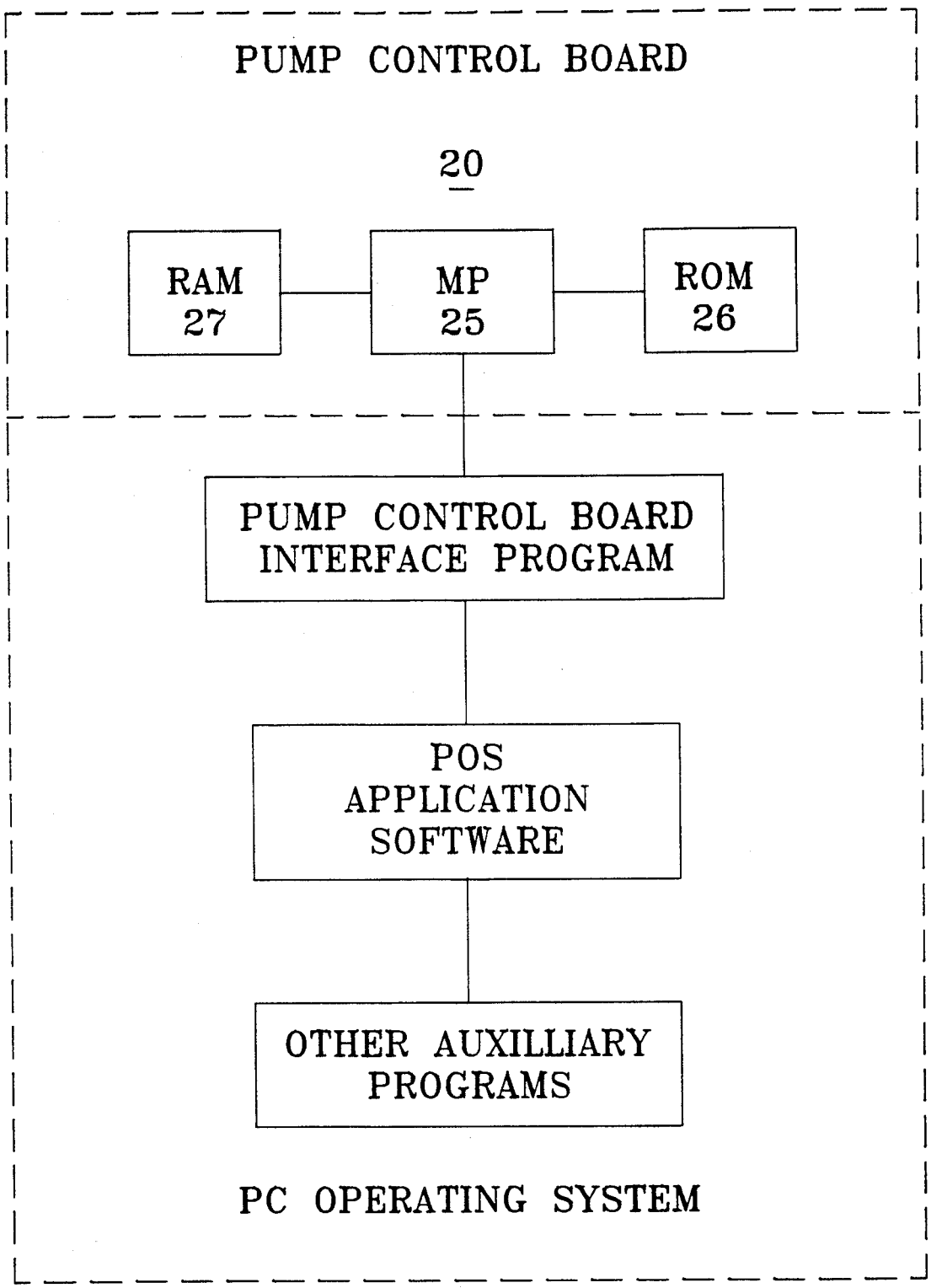
FIG. 3 is a block diagram illustrating the interface between the invention and the POS application software.

Referring now to FIG. 3, there is shown a block diagram illustrating the interface between the pump control system and the POS application software. As previously discussed, a PC-based POS system can integrate several features as cash register function, credit card processing, etc., through auxiliary software programs. In the illustration, the driver for the pump control system is a terminate-stay-resident (TSR) program. Data on the dispensing process is stored and accessed through the RAM (27), and includes pump status, price per gallon of the fuel being dispensed, pump totals for fuel dispensed, as well as response data during a transaction. The RAM (27) is associated with the ROM (26) through microprocessor (25) as previously discussed.

Following is an example of a MS/DOS driver for the pump control system (20). It is understood that the DOS driver is an illustrative example only, other PC operating systems could be used in the present invention. The driver is a TSR program for controlling the flow of data to and from the pump control system (20). The TSR is accessed with the use of a DOS "interrupt" with the AH register containing the function number and the DS:DX (segment register). The register contains the buffer address of the data to or from the driver.

The TSR driver makes use of two DOS interrupts. One interrupt is used for access to the driver; the other interrupt is used for a link to the "Timer-Tick", used for time out operations.

This function returns the driver status. If a BUSY (1 16 status) is in the register, the last command posted is still in progress. If a DONE (0 16 status) is returned in the AL,, the last command posted is complete and any response is ready to read. If the status is DONE, the AH register contains any error associated with the command.

```
AH =            0 No error
                1 Time out
                2 Check sum error
                3 NAK error
```

PUMP STATUS - Function 2 16

This function returns the current system and pump status. When there is no command for the driver to process, it request the pump status and stores it in a buffer. Each status byte contains 8 bits of status according to the extended status definitions. The status is transferred to the buffer pointed to by DS:DX and requires 33 bytes.

SEND COMMAND - Function 3 16

This function sends the buffer pointed to by DS:DX to the pump control system. The first byte of the buffer contains the number of bytes to transmit; the second byte contains the number of bytes to receive (0=no receive expected); the third byte is the beginning of the data. This function sets a busy signal; when the command is complete, a DONE status is returned by Function 1.

READ DATA - Function 4 16

This command returns the data received in response to the last command. The data is transferred to the buffer pointed to by DS:DX. The buffer must be large enough to hold the number of bytes requested in the RECEIVE COUNT (second byte) from the last SEND command. The AH register contains the error that occurred during the command operation (0=no error).

DRIVER INITIALIZATION - Function 0 16

This function initiates the TRS interrupt operation and is used after the driver has been installed.

Figure 5:
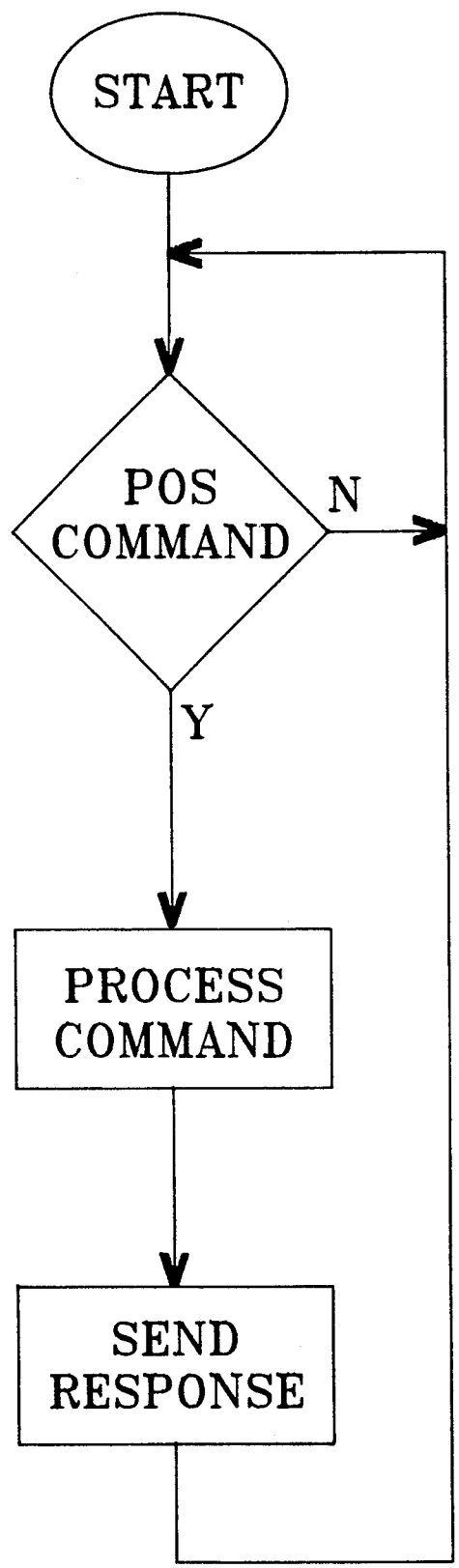
FIG. 5 is a flow chart of the operation of the read-and-write-memory device of the invention.

Referring now to FIG. 5, there is shown a flow chart for processing the POS commands relating to dispensing fuel. The POS microprocessor (30) is constantly polling the pump control RAM (27) to determine pump status and related information. When the RAM (27) receives a command from the POS application software (through the previously discussed driver) the command is processed in the RAM (27) in association with pump control ROM (26). Take for example pump authorization, a command needed when a customer is at dispenser requesting service. The store attendant pushes an authorization key on the POS (16) The POS application software transfers the command through the TSR driver to the RAM (27). The authorization command, which is stored in the ROM (26), is retrieved and sent to the dispenser causing authorization. The dispenser responds indicating that the controller has been authorized, and the response is transferred from the RAM (27) to the POS application software through the discussed driver.

The present invention may, of coarse, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A pump control system for controlling at least one fuel dispenser during the fueling process through a PC-based Point-of-Sales system, where the pump control system includes a printed circuit board which functions as an interface between a first microprocessor in said dispenser, and a second microprocessor in said PC-based POS system, comprising:
   (a) a read-only-memory device for storing a series of commands for controlling said dispenser during the fueling process;
   (b) a read-and-write memory device for storing response data from said dispenser during the fueling process;
   (c) a pump control processing means, operatively connected through a serial port to said first microprocessor in said dispenser, and operatively connected through a parallel port to said second microprocessor in said PC-based POS system, for:
(1) retrieving commands from said read-only-memory device in a predetermined sequence and outputting said commands in a readable format to said first microprocessor in said dispenser causing said dispenser to dispense fuel;
(2) receiving response data from said first microprocessor during the fueling process and storing said response data in said read-and-write-memory device;
(3) processing and outputting said response data to said second microprocessor in said PC-based POS system;
   (d) a configuring means electrically connected to said pump control processing means and to said first microprocessor in said dispenser for translating the communication protocols so that said commands are readable by said first microprocessor and said response data is readable by said pump control processing means.

2. A pump control system as defined in claim 1, further comprising pin connectors on said circuit board suitable for inserting in an expansion slot in said second microprocessor.

3. A pump control circuit board for controlling the dispensing process, used in combination with at least one fuel dispenser having a first microprocessor with programmable memory device for the dispensing operation, and a PC-based POS system having a second microprocessor with programmable memory device having POS application programming for register function, comprising:
   (a) a printed circuit board having pin connectors suitable for connecting said circuit board to said second microprocessor in said PC;
   (b) a read-only-memory device on said circuit board for storing a series of commands to control said dispenser during the fueling process;
   (c) a read-and-write-memory device on said circuit board for storing response data from said dispenser during the fueling process;
   (d) a pump control processing means, operatively connected through a serial port to said first microprocessor in said dispenser, and operatively connected through a parallel port to said second microprocessor in said POS, for
      (1) retrieving said commands from said read-only-memory device in a predetermined sequence and outputting said commands in a readable format to said first microprocessor in said dispenser causing said dispenser to dispense fuel;
      (2) receiving response data from said first microprocessor during the fueling process and storing said response data in said read-and-write-memory device;
      (3) processing and outputting said response data to said microprocessor in said PC-based POS system through a driver interface program for controlling the flow of data between the two;
   (e) a configuration circuit with power supply, electrically connected between said pump control processing means and said first microprocessor in said dispenser, for translating the communication protocols of the two so that said commands are readable by said first microprocessor and said response data is readable by said pump control processing means.

4. A pump control board for controlling fuel dispensers, used in combination with at least one fuel dispenser having a first microprocessor with programmable memory device for performing the dispensing function, a PC-based POS system having a second microprocessor with programmable memory device having POS application software for performing cash register function, where said pump control board is interfaced by a driver, and a configuring circuit for translating communication protocols between said pump control board and said dispenser, wherein the improvement comprises:
   (a) a printed circuit board having pin connectors for inserting said circuit board into an expansion slot in said second microprocessor in said PC-based POS system,
   (b) a read-only-memory device on said circuit board for storing a series of commands for controlling said dispenser during the fueling operation;

(c) a read-and-write-memory device on said circuit board for storing response data from said dispenser during the fueling operation;

(d) a pump control processing means, operatively connected through a serial port to said first microprocessor in said dispenser, and operatively connected through a parallel port to said second microprocessor in said PC-based POS system for (1) retrieving commands from said read-only-memory device in a predetermined sequence and outputting said commands in a readable format to said first microprocessor in said dispenser causing said dispenser to dispense fuel, (2) receiving response data from said first microprocessor during the fueling process and storing said response data in said read-and-write-memory device;

(3) processing and outputting said response data to said microprocessor in said PC-based POS system where said dispenser are controlled through said POS system.

5. The method as defined in claim 4, further comprising the step of:

(e) reading the total amount of fuel dispensed from said dispenser by a pump totals command with format including command character, fielding position, and hose number, whereas said dispenser responds with response including fueling position, hose number, and totals type flag for indicating volume totals or money totals.

6. A method for controlling the dispensing process by a pump control board including a first microprocessor with read-only-memory for storing control commands and read-and-write-memory for storing responses to said commands, in combination with, at least one fuel dispenser having a second microprocessor with programmable memory device for operating the dispenser, a PC-based POS system having a third microprocessor with programmable memory device and application program for operating the POS, a configuration circuit for translating communication protocols between said control circuit board and said dispenser, said control circuit board being inserted in an expansion slot of said PC-based POS system, comprising the steps of:

(a) setting the price per unit of the fuel to be dispensed by said dispenser by sending a command format including fueling position, hose number, read or write operation flag, and unit price, whereas with a write operation flag the price is stored in said memory of said dispenser, with a read operation flag said dispenser responds back to said first microprocessor with response indicating fueling position, hose number, and unit price stored;

(b) starting the dispensing process by an authorization command with format including command code, fueling position, hose number, and limit amount of fuel to be dispensed;

(c) polling the status of said dispenser by a status request command with format including fueling position and hose number, whereafter said dispenser responds with status indicator response including hose is dispensing fuel, hose is idle, pump handle has been lifted and service is requested at hose;

(d) reading sales information by a sales information command with format including command code, fueling position, hose number, and operational flag, whereas with a read operation flag said dispenser responds to said first microprocessor with response including pump number, hose number, and amount of fuel dispensed, or with a clear operation flag thereby the sale flag is cleared.

* * * * *